Patented Sept. 18, 1951

2,568,115

UNITED STATES PATENT OFFICE 2,568,115

PROCESSES FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application January 6, 1950, Serial No. 137,294

5 Claims. (Cl. 252—331)

This invention relates to processes or procedures particularly adapted for preventing, breaking, or resolving emulsions of the water-in-oil type, and particularly petroleum emulsions. This application is a continuation-in-part of our co-pending application Serial No. 8,723, filed February 16, 1948 which has now matured into Patent No. 2,499,366, dated March 7, 1950. Also see our co-pending application Serial No. 74,474, filed February 3, 1949.

Complementary to the above aspect of the invention is our companion invention concerned with the new chemical products or compounds used as the demulsifying agents in said aforementioned processes or procedures, as well as the application of such chemical compounds, products, and the like, in various other arts and industries, along with the method for manufacturing said new chemical products or compounds which are of outstanding value in demulsification. See our co-pending application Serial No. 137,295, filed January 6, 1950.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

Demulsification, as contemplated in the present application, includes the preventative step of commingling the demulsifier with the aqueous component which would or might subsequently become either phase of the emulsion in the absence of such precautionary measure. Similarly, such demulsifier may be mixed with the hydrocarbon component.

Briefly stated, the present process is concerned with the breaking or resolving of petroleum emulsions by means of the oxyalkylated derivatives of certain resins hereinafter specified.

The present process is concerned with breaking petroleum emulsions of the water-in-oil type, characterized by subjecting the emulsion to the action of a demulsifier, including hydrophile synthetic products; said hydrophile synthetic products being oxyalkylation products of—

(A) An alpha-beta alkylene oxide having not more than 4 carbon atoms and selected from the class consisting of ethylene oxide, propylene oxide, butylene oxide, glycide and methylglycide; and (B) An oxyalkylation - susceptible, fusible, organic solvent-soluble, water-insoluble phenol-furfural resin; said resin being derived by reaction between a difunctional monohydric phenol and furfural; said resin being formed in the substantial absence of trifunctional phenols; said phenol being of the formula:

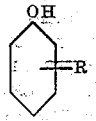

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

For purpose of convenience, what is said hereinafter will be divided into three parts: Part 1 will be concerned with the production of the resin from a mixture of the kind specified and described in greater detail subsequently; Part 2 will be concerned with the oxyalkylation of the resin so as to convert it into a hydrophile hydroxylated derivative; and Part 3 will be concerned with the use of such derivatives as demulsifiers, as hereinafter described.

PART 1

The production of resins from difunctional hydrocarbon-substituted phenols is well known and such resins are important in the art, particularly in the preparation of varnish and similar coatings. Those derived from furfural instead of formaldehyde, for example, have limitations in their use, due to the fact that furfural is apt to give a compound having a dark color. In any event, the production of such resins is conventional.

In the preparation of the resins and also in the subsequent oxyalkylation step described in Part Two, frequent reference will be made to a number of co-pending applications, for purpose of reference as required.

Example 1AA

| | Grams |
|---|---|
| Para-tertiary amylphenol | 164 |
| Furfural | 96 |
| Potassium carbonate | 8 |

The equipment used was a conventional two-piece laboratory resin pot. The cover part of the equipment had four openings; one for reflux condenser, one for the stirring device, one for a separatory funnel or other means of adding reactants; and a thermometer well. The device was equipped with a combination reflux and water-trap apparatus, so that the single piece of apparatus could be used as either a reflux condenser or a water trap, depending upon the position of the three-way glass stop-cock. This permitted convenient withdrawal of water from the water trap. The equipment, furthermore, permitted any setting of the valve without disconnecting the equipment. The resin pot was heated with a glass fibre electrical heater constructed to fit snugly around the resin pot. Such heaters, with regulators, are readily available.

The furfural was shaken with dry sodium carbonate prior to use, to eliminate any acid, etc. The procedure employed was substantially that described in detail in Technical Bulletin No. 109 of the Quaker Oats Company, Chicago, Illinois. The above reactants were heated under the reflux condenser for two hours in the same resin pot arrangement described above. As previously stated, the separatory funnel device was not employed. No xylene or other solvent was added. The amount of material vaporized and condensed was comparatively small, except for the water of reaction. At the end of this heating or reflux period the trap was set to remove the water. The maximum temperature during and after removal of water was approximately 202° C. The material in the trap represented 16 cc. water and 1.5 cc. furfural. The resin was a bright black, hard resin, xylene-soluble, and had a melting point of 130° to 135° C., with some tendency towards being slowly curable. We have also successfully followed this same procedure, using 3.2 grams of potassium carbonate instead of 8.0 grams.

For purpose of comparison, see Example 42a in our co-pending application Serial No. 82,704, filed May 21, 1949 (now Patent No. 2,499,370, dated March 7, 1950), in which the same designation, i. e., Example 42a, is again employed to identify the same example.

Example 2AA

| | Grams |
|---|---|
| Para-tertiary amylphenol | 164 |
| Furfural (carbonate treated) | 70 |
| Potassium carbonate | 3.2 |

The procedure employed was the same as that of Example 1AA, preceding. The amount of water distilled was 10 cc. and the amount of furfural 3 cc. The resin was a bright black, xylene-soluble resin, semi-pliable to hard.

See Example 43a in our co-pending application, Serial No. 82,704, filed May 21, 1949, in which the same designation, i. e., Example 43a, is again employed to identify the same example.

Example 3AA

| | Grams |
|---|---|
| Nonylphenol (1.0 mole) | 220 |
| Furfural (Na₂CO₃ treated) (1.0 mole) | 96 |
| Potassium carbonate | 12 |
| Xylene | 200 |

The furfural was shaken with dry sodium carbonate prior to use to eliminate any acids, etc., as in previous examples. The procedure employed was substantially that described in detail in Technical Bulletin No. 109 of the Quaker Oats Company, Chicago, Illinois. The materials, except the xylene, were heated under a reflux condenser for 2 hours in the same resin pot arrangement described in Example 1AA. At the end of this heating or reflux period the trap was set to remove the water, and the xylene added after most of the water had distilled. The maximum temperature during and after removal of water was approximately 205° C. The resin was a reddish black resin, xylene-soluble, and semi-soft to pliable in consistency.

See Example 90a of our co-pending application Serial No. 8,723, filed February 16, 1948, or Example 88a of Serial No. 74,474, filed February 3, 1949.

Example 4AA

| | Grams |
|---|---|
| Menthylphenol (1.0 mole) | 232 |
| Furfural (Na₂CO₃ treated) (1.0 mole) | 96 |
| Potassium carbonate | 12 |
| Xylene | 200 |

The procedure followed was the same as that in Example 1AA, preceding. The solvent-free resin was reddish black in color, hard, brittle, with a melting point of 158° to 163° C., and showed a definite tendency towards being heat-curable.

See Example 91a of our co-pending application, Serial No. 8,723, filed February 16, 1948, or Example 89a of Serial No. 74,474, filed February 3, 1949.

Example 5AA

The same procedure was followed as in Example 1AA, preceding, except that 206 parts by weight of commercial para-octylphenol replaced 164 parts by weight of para-tertiary amylphenol. In co-pending application Serial No. 74,474 this particular resin is indicated as Example 144a, and the resin previously referred to as Example 1AA is referred to as Example 42a.

Example 6AA

The same procedure was followed as in Example 1AA, preceding, except that 170 parts by weight of commercial para-phenylphenol replaced 164 parts by weight of para-tertiary amylphenol. In our co-pending application Serial No. 74,474, this resin was referred to as Example 149a, and Example 1AA was referred to as Example 42a.

Example 7AA

| | Grams |
|---|---|
| Para-tertiary butylphenol | 150 |
| Furfural, (Na₂CO₃ treated) | 96 |
| Potassium carbonate | 10 |
| Xylene | 200 |

The procedure employed was the same as that in Example 1AA, preceding. The solvent-free resin was black or reddish black in color, xylene-soluble, hard and very brittle. Its melting point was between 220°–230° C. It was found to be heat-curable.

Example 8AA

This resin was made in exactly the same way as Example 1AA, except that 164 parts by weight of para-tertiary amylphenol were replaced by 206 parts by weight of para-octylphenol. The final product had substantially the same appearance, solubility characteristics, etc., as resin Example 1AA.

Example 9AA

This resin was made in exactly the same way as Example 1AA, except that 164 parts by weight of para-tertiary amylphenol were replaced by 170 parts of commercial para-phenylphenol. The final product had substantially the same appearance, solubility characteristics, etc., as resin Example 1AA.

The resinification procedure previously described yields resins having at least 3 phenolic nuclei and usually modestly in excess thereof. In other words, an average of 4, 5 or 5½ or 6 nuclei per resin molecule.

As pointed out in our aforementioned co-pending application Serial No. 8,723, other means are available to yield resins in which there may be present a larger number of phenolic nuclei, for instance, 7 to 15. Such resins are conveniently obtained by subjecting the resin obtained in the conventional manner to further treatment under a vacuum at a temperature below the pyrolytic point of the resin. Sometimes the expression "low-stage" resin or "low-stage" intermediate is employed to mean a stage having 6 or 7 units, or even less. In the appended claims we have used "low-stage" to mean 3 to 7 units based on average molecular weight.

PART 2

Example 1BB

The resin employed was the one described under the heading of Example 1AA. 100 grams of the resin were mixed with 100 grams of xylene so as to give a 50% solution. 2% of sodium methylate, based on the solvent-free resin, was added as a catalyst. The solution of the resin was placed in a small laboratory autoclave and the mixture reacted with 50 grams of ethylene oxide. During this addition the maximum temperature was 115° C., the maximum pressure was 104 pounds per square inch, and the time required to add the oxide was 2 hours. Needless to say, the mixture was stirred constantly during the reaction and the reaction considered at an end when there was no further drop in pressure, thus indicating that all the ethylene oxide present had reacted. The pressure registered on the gauge at the end of the reaction indicated the vapor pressure of xylene at the indicated temperature. At the end of this first addition there was no particular change in the solubility of the product, i. e., it was practically as insoluble as the original xylene solution of the resin. A second 50 grams of ethylene oxide were added in another 2-hour period. In this second addition the maximum temperature was 130° and the maximum pressure 95 pounds. At the end of this period the product began to show a definite tendency to emulsify.

A third 50-gram addition of ethylene oxide was then made during a one-hour period. In this particular addition the maximum temperature was 120° and the maximum pressure 96 pounds. The product at the end of this 3-hour period was entirely water-soluble.

Example 2BB

The same procedure was followed as in Example 1BB immediately preceding, except that the resin employed was that of Example 2AA, instead of 1AA. The two initial resins were very much alike and the conditions of addition were substantially the same, i. e., 150 grams of ethylene oxide added to 100 grams of resin in three periods of 2 hours, 2 hours and 1 hour. The conditions under which addition of ethylene oxide was made, as far as temperature and pressure are concerned, were substantially the same as in Example 1BB, preceding. The amount of sodium methylate added was the same, and the solubility characteristics at the end of each period were substantially the same.

Example 3BB

The same reactants, and procedure were employed as in Example 1BB, preceding, except that propylene oxide was employed instead of ethylene oxide. The resultant, even on the addition of the alkylene oxide in the weight proportions of the previous example, has diminished hydrophile properties, in comparison with the resultants of Example 1BB. This illustrates the point that propylene oxide and butylene oxide give products of lower levels of hydrophile properties than does ethylene oxide.

Example 4BB

The same reactants and procedure were followed as in Example 1BB, preceding, except that one mole of glycide was employed initially per hydroxyl radical. This particular reaction was conducted with extreme care and the glycide was added in small amounts representing fractions of a mole. Ethylene oxide was then added, following the procedure of Example 1BB, to produce products of greater hydrophile properties. We are extremely hesitant to suggest even the experimental use of glycide and methylglycide for the reason that disastrous results may be obtained even in experimentation with laboratory quantities.

Example 5BB

The same procedure was followed as in Example 1BB, preceding, except that the resin employed was the one described under the heading of Example 7AA. The amount of resin used was 100 grams, dissolved in 100 grams of xylene. 4 grams of sodium methylate were added, along with 100 grams of ethylene oxide. Due to the increased amount of catalyst, the reaction time was somewhat more rapid than in Example 1AA, preceding. The reaction was complete in one-half hour. The maximum temperature employed was 150° C., and the maximum pressure 150 pounds per square inch. At the end of this period the product showed some tendency to emulsify.

The second addition of 100 grams of ethylene oxide was then made. The time required was 1⅓ hours, the maximum temperature was 150° C., and the maximum pressure 160 pounds. The product showed definite water-emulsifiability but was not water-soluble.

A third addition of ethylene oxide was made, using another 100 grams. The maximum temperature during this period was 162° C., and the maximum pressure 165 pounds. The time required was 2¾ hours. During this third period there was a definite tendency toward rubberiness and the product seemed to be only partially soluble in xylene. The product was solubilized by the addition of the diethylether of ethylene glycol. 150 grams of this solvent were added. The product then was a deep amber-colored, somewhat viscous liquid, which was water-soluble.

Instead of preparing resins on a laboratory scale, we have also prepared phenol-furfural resins of the kind described, in a 10 to 15-gallon electro-vapor synthetic resin pilot plant reactor. Such piece of equipment is manufactured by the Blaw-Knox Company, Pittsburgh, Pennsylvania, and is described completely in their Bulletin No. 2087, issued in 1947, with specific reference to Specification No. 713,965.

For convenience, the numbers given in the following tables are the same as the identical laboratory size batches previously described, and it is understood that they were simply stepped up in size, but otherwise made in the pilot plant equipment previously described.

The solvent used in each instance was xylene. This solvent is particularly satisfactory, for the reason that it can be removed readily by distillation or vacuum distillation. In these continuous experiments the speed of the stirrer in the autoclave was 250 R. P. M.

In the subsequent tables it will be noted that if a comparatively small sample is taken at each stage, for instance, one-half to one gallon, one can proceed through the entire molal stage of one to one, to one to 20, without remaking at any intermediate stage. However, in most cases, we have found it desirable to take a larger sample, for instance, a 3-gallon sample, at an intermediate stage. As a result, it was necessary in such instances to start with a new resin sample, in order to prepare sufficient oxyethylated derivatives illustrating the latter stages. Under such circumstances, of course, the earlier stages which had been previously prepared were by-passed or ignored. This is illustrated in the tables, where obviously, it shows that the starting mix was not removed from a previous sample. Such pilot plant size resin pot is adapted to operate under pressure; and provided the resin permits a working pressure of 200 pounds or thereabouts, resinification and oxyalkylation can take place in the same piece of equipment. We have repeatedly used equipment for this dual purpose.

In order to do what we have stated previously, i. e., preserve reference to our copending application Serial No. 74,474, filed February 3, 1949, we are presenting the same data which appears therein in verbatim form adding only one thing to identify the resin in the instant case.

*Phenol for resin: Para-tertiary amylphenol    Aldehyde for resin: Furfural*

Date, August 27-31, 1948

[Resin made on pilot plant size batch, approximately 25 pounds, corresponding to 42a but this batch designated as 134a].

| Resin 1AA | Starting Mix | | | Mix at End of Reaction | | | Mix Which is Removed for Sample | | | Mix Which Remains as next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| Ex. 6BB First Stage Resin to EtO Molal Ratio 1:1 Ex. No. 134b | 11.2 | 18.0 | ------ | 11.2 | 18.0 | 3.5 | 2.75 | 4.4 | 0.85 | 8.45 | 13.6 | 2.65 | 120 | 135 | ½ | Not soluble. |
| Ex. 7BB Second Stage Resin to EtO Molal Ratio 1:5 Ex. No. 135b | 8.45 | 13.6 | 2.65 | 8.45 | 13.6 | 12.65 | 5.03 | 8.12 | 7.55 | 3.42 | 5.48 | 5.10 | 110 | 150 | ¼ | Somewhat soluble. |
| Ex. 8BB Third Stage Resin to EtO Molal Ratio 1:10 Ex. No. 136b | 4.5 | 8.0 | ------ | 4.5 | 8.0 | 14.5 | 2.45 | 4.35 | 7.99 | 2.05 | 3.65 | 6.60 | 180 | 163 | ½ | Soluble. |
| Ex. 9BB Fourth Stage Resin to EtO Molal Ratio 1:15 Ex. No. 137b | 3.42 | 5.48 | 5.10 | 3.42 | 5.48 | 15.10 | ------ | ------ | ------ | ------ | ------ | ------ | 180 | 188 | ⅓ | Very soluble. |
| Ex. 10BB Fifth Stage Resin to EtO Molal Ratio 1:20 Ex. No. 138b | 2.05 | 3.65 | 6.60 | 2.05 | 3.65 | 13.35 | ------ | ------ | ------ | ------ | ------ | ------ | 120 | 125 | ⅓ | Do. |

Resin is 1AA. Reference to 42a and 134a is for comparison with Serial No. 74,474, filed Feb. 3, 1949. This is true also in regard to reference to Ex. 134b to 138b, inclusive. These 5 examples in the present case are, as noted, Examples 6BB thru 10BB, inclusive.

*Phenol for resin: Para-nonylphenol*     *Aldehyde for resin: Furfural*

Date, October 13–15, 1948

[Resin made on pilot plant size batch, approximately 25 pounds, corresponding to 88a but this batch designated as 154a].

| Resin 3AA | Starting Mix | | | Mix at End of Reaction | | | Mix Which is Removed for Sample | | | Mix Which Remains as next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *Ex. 11BB First Stage* Resin to EtO Molal Ratio 1:1 Ex. No. 154b | 10.85 | 20.75 | ------ | 10.85 | 20.75 | 3.0 | 2.57 | 4.90 | 0.73 | 8.28 | 15.85 | 2.27 | 100 | 150 | ⅓ | Insoluble. |
| *Ex. 12BB Second Stage* Resin to EtO Molal Ratio 1:5 Ex. No. 155b | 8.28 | 15.85 | 2.27 | 8.28 | 15.85 | 11.77 | 3.82 | 7.33 | 5.45 | 4.46 | 8.52 | 6.32 | 100 | 182 | ⅓ | Slight tendency toward becoming soluble. |
| *Ex. 13BB Third Stage* Resin to EtO Molal Ratio 1:10 Ex. No. 156b | 5.95 | 11.35 | ------ | 5.95 | 11.35 | 16.75 | 3.38 | 6.42 | 9.50 | 2.57 | 4.93 | 7.25 | 100 | 181 | ½ | Fairly soluble. |
| *Ex. 14BB Fourth Stage* Resin to EtO Molal Ratio 1:15 Ex. No. 157b | 4.46 | 8.52 | 6.32 | 4.46 | 8.52 | 19.07 | ----- | ----- | ----- | ----- | ----- | ----- | 90 | 188 | ⅓ | Readily soluble. |
| *Ex. 15BB Fifth Stage* Resin to EtO Molal Ratio 1:20 Ex. No. 158b | 2.57 | 4.93 | 7.25 | 2.57 | 4.93 | 14.50 | ----- | ----- | ----- | ----- | ----- | ----- | 100 | 160 | ⅓ | Quite soluble. |

Resin is 3AA. Reference to 88a and 154a is for comparison with Serial No. 74,474, filed Feb. 3, 1949. This is true also in regard to reference to Ex. 154b to 158b, inclusive. These 5 examples in the present case are, as noted, Examples 11BB thru 15BB, inclusive.

*Phenol for resin: Menthyl phenol*     *Aldehyde for resin: Furfural*

Date, September 23–24, 1948

[Resin made on pilot plant size batch, approximately 25 pounds, corresponding to 89a but this batch designated as 139a.]

| Resin 4AA | Starting Mix | | | Mix at End of Reaction | | | Mix Which is Removed for Sample | | | Mix Which Remains as next Starter | | | Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| *Ex. 16BB First Stage* Resin to EtO Molal Ratio 1:1 Ex. No. 139b | 10.25 | 17.75 | ------ | 10.25 | 17.75 | 2.5 | 2.65 | 4.60 | 0.65 | 7.6 | 13.15 | 1.85 | 90 | 150 | ⅙ | Not soluble. |
| *Ex. 17BB Second Stage* Resin to EtO Molal Ratio 1:5 Ex. No. 140b | 7.6 | 13.15 | 1.85 | 7.6 | 13.15 | 9.35 | 5.2 | 9.00 | 6.40 | 2.4 | 4.15 | 2.95 | 80 | 177 | ⅙ | Somewhat soluble. |
| *Ex. 18BB Third Stage* Resin to EtO Molal Ratio 1:10 Ex. No. 141b | 4.22 | 6.98 | ------ | 4.22 | 6.98 | 10.0 | ----- | ----- | ----- | ----- | ----- | ----- | 90 | 165 | ½ | Soluble. |
| *Ex. 19BB Fourth Stage* Resin to EtO Molal Ratio 1:15 Ex. No. 142b | 3.76 | 6.24 | ------ | 3.76 | 6.24 | 13.25 | ----- | ----- | ----- | ----- | ----- | ----- | 100 | 171 | ½ | Very soluble. |
| *Ex. 20BB Fifth Stage* Resin to EtO Molal Ratio 1:20 Ex. No. 143b | 2.4 | 4.15 | 2.95 | 2.4 | 4.15 | 11.70 | ----- | ----- | ----- | ----- | ----- | ----- | 90 | 150 | ⅓ | Very soluble. |

Resin is 4AA. Reference to 89a and 139a is for comparison with Serial No. 74,474, filed Feb. 3, 1949. This is true also in regard to reference to Ex. 139b to 143b, inclusive. These 5 examples in the present case are, as noted, Examples 16BB through 20BB, inclusive.

*Phenol for resin: Paraoctyl Phenol*  *Aldehyde for resin: Furfural*

Date, October 7-8, 1948

Resin made on pilot plant size batch, approximately 25 pounds, corresponding to 42a with 206 parts by weight of commercial para-octylphenol replacing 164 parts by weight of para-tertiary amylphenol but this batch designated as 144a.]

| Resin 8AA | Starting Mix ||| Mix at End of Reaction ||| Mix Which is Removed for Sample ||| Mix Which Remains as next Starter ||| Max. Pressure lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| Ex. 21BB First Stage Resin to EtO Molal Ratio 1:1 Ex. No. 144b | 12.1 | 18.6 | ------ | 12.1 | 18.6 | 3.0 | 5.38 | 8.23 | 1.34 | 6.72 | 10.32 | 1.66 | 80 | 150 | ½ | Insoluble. |
| Ex. 22BB Second Stage Resin to EtO Molal Ratio 1:5 Ex. No. 145b | 9.25 | 14.25 | ------ | 9.25 | 14.25 | 11.0 | 3.73 | 5.73 | 4.44 | 5.52 | 8.52 | 6.56 | 100 | 177 | 5/12 | Slight tendency toward becoming soluble. |
| Ex. 23BB Third Stage Resin to EtO Molal Ratio 1:10 Ex. No. 146b | 6.72 | 10.32 | 1.66 | 6.72 | 10.32 | 14.91 | 4.97 | 7.62 | 11.01 | 1.75 | 2.70 | 3.90 | 85 | 182 | ¼ | Fairly soluble. |
| Ex. 24BB Fourth Stage Resin to EtO Molal Ratio 1:15 Ex. No. 147b | 5.52 | 8.52 | 6.56 | 5.52 | 8.52 | 19.81 | ------ | ------ | ------ | ------ | ------ | ------ | 100 | 176 | ⅓ | Readily soluble. |
| Ex. 25BB Fifth Stage Resin to EtO Molal Ratio 1:20 Ex. No. 148b | 1.75 | 2.70 | 3.90 | 1.75 | 2.70 | 8.4 | ------ | ------ | ------ | ------ | ------ | ------ | 80 | 160 | ¼ | Quite soluble. |

Resin is 8AA. Reference to 42a and 144a is for comparison with Serial No. 74,474, filed Feb. 3, 1949. This is true also in regard to reference to Ex. 144b through 148b, inclusive. These 5 examples in the present case are, as noted, Examples 21BB thru 25BB, inclusive.

*Phenol for resin: Para-phenyl phenol*  *Aldehyde for resin: Furfural*

Date, October 11-13, 1948

[Resin made on pilot plant size batch, approximately 25 pounds, corresponding to 42a with 170 parts by weight of commercial paraphenylphenol replacing 164 parts by weight of para-tertiary amylphenol but this batch designated as 149a.]

| Resin 9AA | Starting Mix ||| Mix at End of Reaction ||| Mix Which is Removed for Sample ||| Mix Which Remains as Next Starter ||| Max. Pressure, lbs. sq. in. | Max. Temperature, °C. | Time, hrs. | Solubility |
|---|---|---|---|---|---|---|---|---|---|---|---|---|---|---|---|---|
| | Lbs. Solvent | Lbs. Resin | Lbs. EtO | Lbs. Solvent | Lbs. Resin | Lbs. EtO | Lbs. Solvent | Lbs. Resin | Lbs. EtO | Lbs. Solvent | Lbs. Resin | Lbs. EtO | | | | |
| Ex. 26BB First Stage Resin to EtO Molal Ratio 1:1 Ex. No. 149b | 13.9 | 16.7 | ------ | 13.9 | 16.7 | 3.0 | 3.50 | 4.25 | 0.80 | 10.35 | 12.45 | 2.20 | 100 | 160 | ⅓ | Insoluble. |
| Ex. 27BB Second Stage Resin to EtO Molal Ratio 1:5 Ex. No. 150b | 10.35 | 12.45 | 2.20 | 10.35 | 12.45 | 12.20 | 5.15 | 6.19 | 6.06 | 5.20 | 6.26 | 6.14 | 80 | 183 | ⅓ | Slight tendency toward solubility. |
| Ex. 28BB Third Stage Resin to EtO Molal Ratio 1:10 Ex. No. 151b | 8.90 | 10.7 | ------ | 8.90 | 10.70 | 19.0 | 5.30 | 6.38 | 11.32 | 3.60 | 4.32 | 7.68 | 90 | 193 | 7/12 | Fairly soluble. |
| Ex. 29BB Fourth Stage Resin to EtO Molal Ratio 1:15 Ex. No. 152b | 5.20 | 6.26 | 6.14 | 5.20 | 6.26 | 16.64 | ------ | ------ | ------ | ------ | ------ | ------ | 100 | 171 | ⅙ | Readily soluble. |
| Ex. 30BB Fifth Stage Resin to EtO Molal Ratio 1:20 Ex. No. 153b | 3.60 | 4.32 | 7.68 | 3.60 | 4.32 | 15.68 | Sample somewhat rubbery and gelatinous but fairly soluble ||||||| 230 | 170 | 2 | |

Resin is 9AA. Reference to 42a and 149a is for comparison with Serial No. 74,474, filed Feb. 3, 1949. This is true also in regard to reference to Ex. 149b to 153b, inclusive. These 5 examples in the present case are, as noted, Examples 26BB thru 30BB, inclusive.

Attention is directed to the fact that the resins herein described must be fusible and soluble in a non-polar solvent, such as xylene, although obviously, they may be soulble and usually are, in other polar or oxygenated solvents, as previously noted. Fusible resins invariably are soluble in one or more organic solvents, such as those mentioned elsewhere herein. It is to be emphasized, however, that the organic solvent employed to indicate or assure that the resin meets this requirement need not be the one used in oxyalkylation. Indeed, solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance, to 100 to 200 mesh, and a slurry or suspension prepared in xylene or the like, and subjected to oxyalkylation. The fact that the resin is soluble in an organic solvent, or the fact that it is fusible, means that it consists of separate molecules. Phenol-aldehyde resins of the type herein specified possess reactive hydroxyl groups and are oxyalkylation-susceptible.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not sufficiently soluble in xylene alone but may require the addition of some ethylene glycol diethylether as described elsewhere. It is understood that such mixture, or any other similar mixture, is considered the equivalent of xylene for the purpose fo this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it become obvious that there is a wide variation in the amount of alkylene oxide employed, as long as it is at least 2 moles per phenolic nucleus, for producing products useful for the practice of this invention. Another variation is the molecular size of the resin chain resulting from reaction between the difunctional phenol and the aldehyde such as formaldehyde. It is well known that the size and nature of structure of the resin polymer obtained varies somewhat with the conditions of reaction, the proportions of reactants, the nature of the catalyst, etc.

PART 3

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well-known classes of demulsifying agents.

It is well known that conventional demulsifying agents may be used in a water-soluble form or in an oil-soluble form, or in a form exhibiting both oil- and water-solubility. Sometimes they may be used in a form which exhibits relatively limited oil-solubility. However, since such reagents are frequently used in a ratio of 1 to 10,000, or 1 to 20,000, or 1 to 30,000, or even 1 to 40,000, or 1 to 50,000, as in desalting practice, such an apparent insolubility in oil and water is not significant, because said reagents undoubtedly have solubility within such concentrations. This same fact is true in regard to the material or materials employed as the demulsifying agent of our process.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent.

Having thus described our invention, what we claim as new and desire to secure by Letters Patent is:

1. A process for breaking petroleum emulsions of the water-in-oil type, characterized by subjecting the emulsion to the action of a demulsifier, including hydrophile synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble, low-stage phenol-furfural resin; said resin being derived by reaction between a difunctional monohydric phenol and furfural; said resin being formed in the substantial absence of trifunctional phenols; said phenol being of the formula:

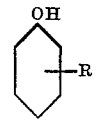

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of said oxyalkylated resin in an equal weight of xylene are sufficient to produce an emulsion when said xylene solution is shaken vigorously with one to three volumes of water.

2. A process for breaking petroleum emulsions of the water-in-oil type, characterized by subjecting the emulsion to the action of a demulsifier, including hydrophile synthetic products; said hydrophile synthetic products being oxyethylation products of (A) ethylene oxide; and (B) an oxyalkylation-susceptible, fusible, organic solvent-soluble, water-insoluble, low-stage phenol-furfural resin; said resin being derived by reaction between a difunctional monohydric phenol and furfural; said resin being formed in the substantial absence of trifunctional phenols; said phenol being of the formula:

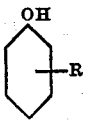

in which R is a hydrocarbon radical having at least 4 and not more than 12 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

3. The process of claim 2, wherein R is an amyl radical.

4. The process of claim 2, wherein R is an octyl radical.

5. The process of claim 2, wherein R is a nonyl radical.

MELVIN DE GROOTE.
BERNHARD KEISER.

REFERENCES CITED

The following references are of record in the file of this patent:

UNITED STATES PATENTS

| Number | Name | Date |
|---|---|---|
| 2,454,541 | Bock et al. | Nov. 23, 1948 |
| 2,499,365 | De Groote et al. | Mar. 7, 1950 |
| 2,499,366 | De Groote et al. | Mar. 7, 1950 |
| 2,499,370 | De Groote et al. | Mar. 7, 1950 |